United States Patent [19]

Young

[11] 4,214,483
[45] Jul. 29, 1980

[54] APPARATUS FOR MEASURING ANGULAR SPEED

[75] Inventor: Niels O. Young, VanHornesville, N.Y.

[73] Assignee: Arthur D. Little, Inc., Cambridge, Mass.

[21] Appl. No.: 932,472

[22] Filed: Aug. 10, 1978

[51] Int. Cl.² ............................................. G01P 3/22
[52] U.S. Cl. .................................. 73/518; 324/160
[58] Field of Search ............. 73/518, 136 A; 324/160, 324/166, 168; 320/1; 323/71, 93

[56] References Cited

U.S. PATENT DOCUMENTS

| 2,929,023 | 3/1960 | Mishcon et al. | 324/168 |
| 2,941,397 | 6/1960 | Lee | 73/114 |
| 3,225,299 | 12/1965 | Middendorf | 324/160 |
| 4,072,051 | 2/1978 | Peterson | 73/362.4 X |

Primary Examiner—Jerry W. Myracle
Attorney, Agent, or Firm—Schiller & Pandiscio

[57] ABSTRACT

Apparatus for measuring the angular velocity and speed of a rotating shaft comprises charge storage elements for storing charge. The charge storage elements are capable of being coupled to the rotating shaft so as to be rotatable about a predetermined axis at an angular speed or velocity related to the speed or velocity of the shaft. A charging brush and discharging brush are positioned relative to the charge storage elements so that the charging brush can charge the charge storage elements at a first predetermined angular position of the latter about the axis and the discharging brush can discharge the charge from the charge storage elements at a second predetermined angular position of the latter about the axis. The second position is angularly displaced and electrically isolated from the first position so that the injection of charge through said charging brush into said charge storage elements and the subsequent discharge thereof through said discharge brush following rotation of the charge storage elements through the angular displacement between said first and second angular positions will produce an electrical signal having a parameter linearly related to the angular speed of the rotating shaft to be measured. The apparatus is particularly useful in a system for measuring the instantaneous power output of the rotating shaft.

27 Claims, 10 Drawing Figures

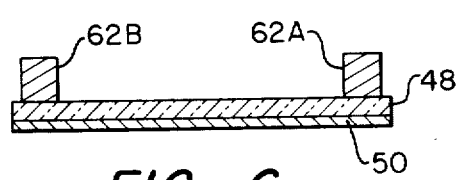
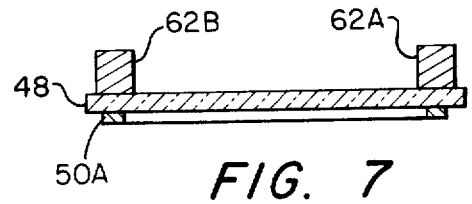
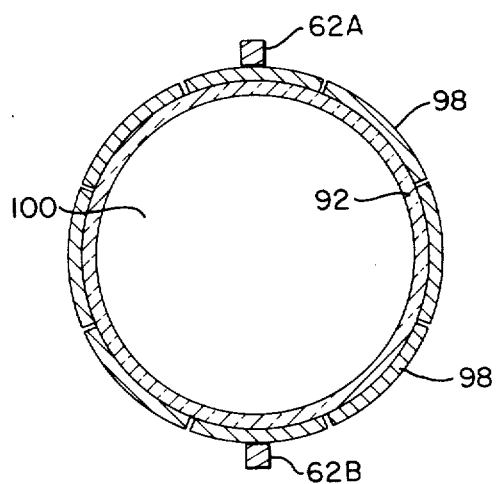
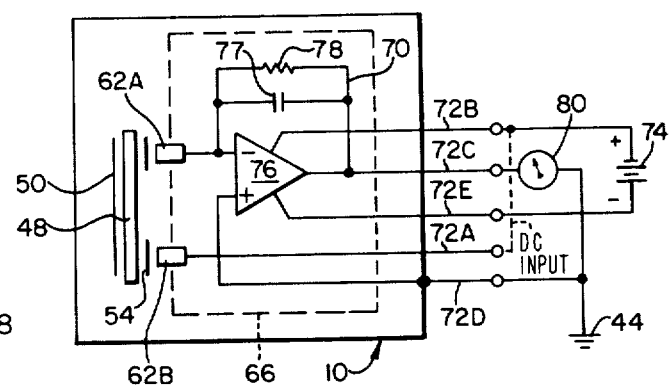
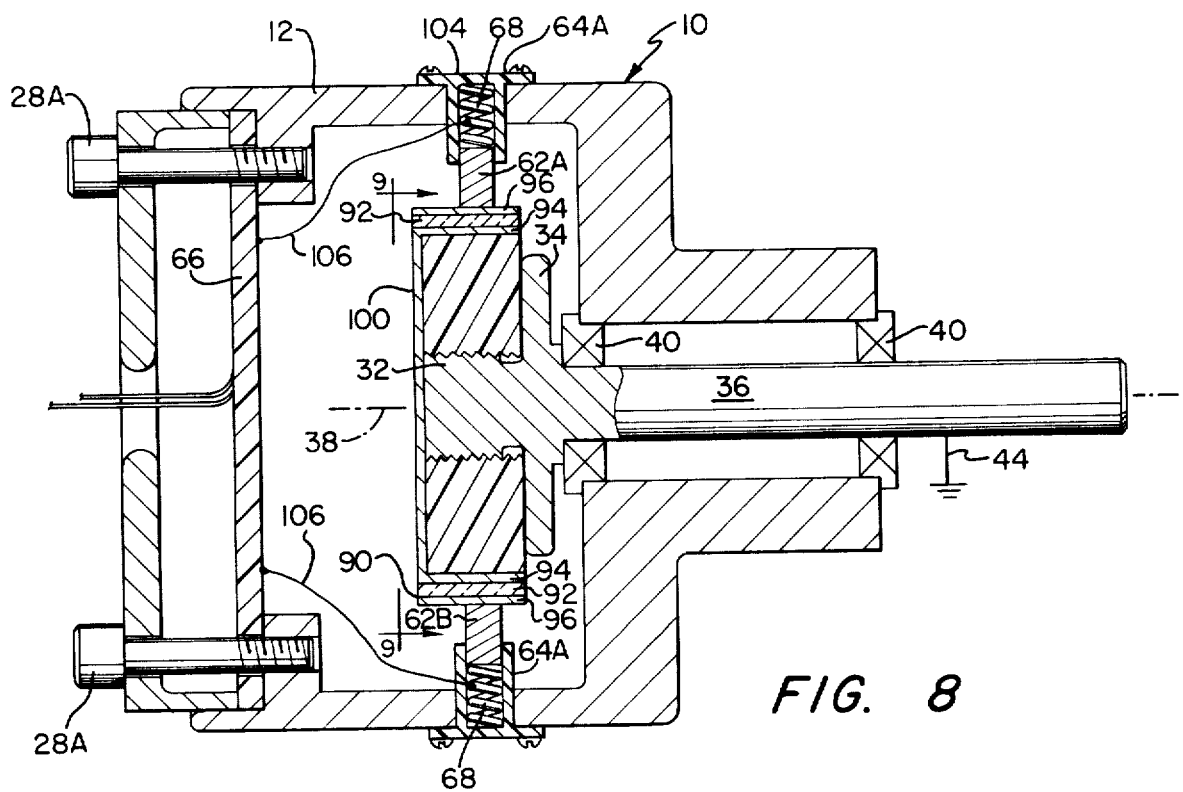

APPARATUS FOR MEASURING ANGULAR SPEED

This invention relates to apparatus for measuring the angular velocity or speed of a rotating shaft and more particularly to improved tachometers.

Apparatus for measuring the angular displacement and speed of a rotating shaft generally include various types of tachometers. For example, among the many known forms of tachometers are single revolution counters, and chronometric, centrifugal, vibrating-reed, impulse, eddy-current, velocity-head, electronic and electric-generator-type tachometers. For a general discussion of these various types of tachometers, see McGraw-Hill Encyclopedia of Science and Technology, McGraw-Hill Book Company, Inc., New York, 1960, Volume 13, pp 382-385. Tachometers are typically used to determine shaft speed, and from this derive a servo signal which is a function of angular displacement, angular velocity, (or speed) or other functions required.

It is an object of the present invention to provide a relatively inexpensive, light weight tachometer which is relatively easy to make and construct.

Another object of the present invention is to provide a tachometer providing an electrical output but requiring few electronic components.

Still another object of the present invention is to provide a tachometer which provides a relatively smooth output signal especially at low speeds and exhibits a stable calibration between its output signal and the angular speed measured over long periods of time.

Yet another object of the present invention is to provide an improved tachometer having a current output linearly proportional to the shaft speed.

Still another object of the present invention is to provide an improved tachometer having an output signal which does not significantly lag the shaft speed.

Yet another object of the present invention is to provide a tachometer capable of indicating the angular speed of a shaft independently of the direction of rotation of the shaft.

And still another object of the present invention is to provide improved apparatus for measuring the instantaneous power output of a rotating shaft.

These and other objects are achieved by an improved apparatus for measuring the angular speed of a rotating shaft. The apparatus comprises charge storage means for storing charge, the charge storage means being capable of being coupled to a rotating shaft, so as to rotate about a predetermined axis of rotation at a predetermined angular speed related to the angular speed of the shaft. Charging means and discharging means are positioned relative to the charge storage means so that the charging means can charge the charge storage means at a first predetermined angular position of the latter about the axis, and the discharging means can discharge the space charge from the charge storage means at a second predetermined angular position of the latter. The second position is angularly displaced from the first position so that the injection of charge through said charging means into said charge storage means and subsequent discharge through said discharging means following rotation of said charge storage means through the angular displacement between said first and second angular positions will produce an electrical signal having a parameter linearly related to the angular speed of the rotating shaft. By charging the charge storage means in accordance with a signal proportional to the torque output of the rotating shaft, the apparatus can be used to provide a signal having a parameter linearly related to the instantaneous power output of the rotating shaft.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 3 is a schematic diagram illustrating the electrical measuring circuit of the tachometer of FIG. 1;

FIG. 6 is a cross-sectional view through a fourth embodiment of the charge storage disk;

FIG. 7 is a cross-sectional view through a fifth embodiment of the charge storage disk;

FIG. 8 is a longitudinal sectional view of another embodiment of the tachometer of the present invention;

FIG. 9 is a partial cross-sectional view taken along line 9—9 of FIG. 8; and

In the drawings, the same numerals are used to refer to similar or like parts.

Figure 1:
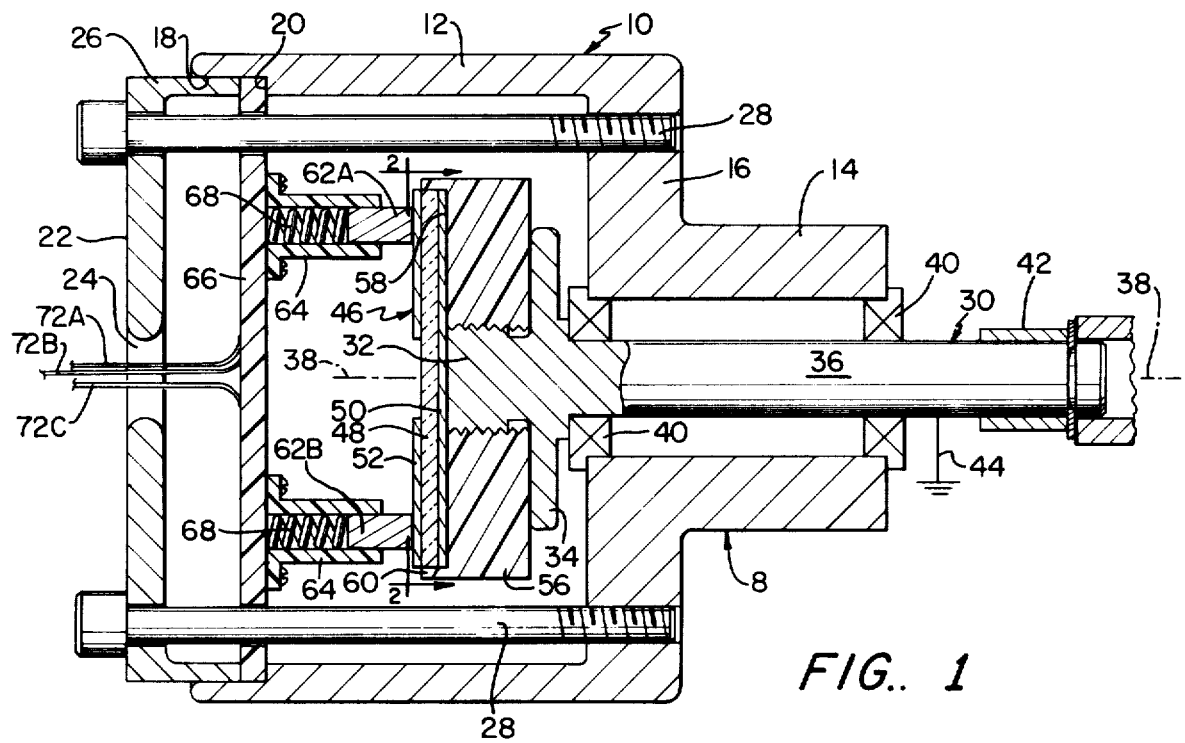
FIG. 1 is a longitudinal sectional view of one embodiment of the tachometer of the present invention.

Referring to FIG. 1, the embodiment of the tachometer 8 of the present invention shown, comprises a bell-shaped housing 10 having an enlarged cylindrical section 12 open at one end and joined at its other end by the annular inwardly-directed radial section 16 to one end of a smaller open-ended cylindrical section 14. The open end of enlarged cylindrical section 12 is counter bored at 18 to provide annular shoulder 20. An end cap 22 includes a suitable aperture such as central aperture 24 and annular lip 26 having an outer radius so as to be adapted to slide in the counter bore 18 toward annular shoulder 20. Suitable means, such as screws 28, extend through cap 22 to radial section 16 so as to secure cap 22 to housing 10. Housing 10 and end cap 22 may be made of any suitable material and preferably are made of an electrically conductive material such as metal in order to provide electrostatic and electromagnetic shielding.

The tachometer of FIG. 1 further includes a rotatable shaft 30 having a screw-threaded end portion 32, annular flange portion 34 and elongated cylindrical shaft portion 36. Shaft 30 is suitably mounted coaxially with the rotation axis 38 for substantially free rotation about axis 38 with respect to housing 10. Preferably, the elongated cylindrical shaft portion 36 is mounted within bearings 40 which in turn are suitably mounted within the smaller open-ended cylindrical section 14. Shaft 30 is mounted so that end portion 32, and flange portion 34 are positioned within enlarged cylindrical section 12 and elongated cylindrical shaft portion 36 extends out the remote end of the smaller open-ended cylindrical section 14 so as to be conveniently exposed. As will be obvious from the discussion hereinafter, the exposed portion of shaft portion 36 is adapted to be coupled to any rotatable shaft whose angular speed is to be measured. The type of coupling is a matter of choice. The coupling can be direct or it can be indirect such as through appropriate gears. Accordingly, shaft portion 36 is shown, only by way of example, secured within and adapted to rotate with sleeve 42, which in turn is suitably coupled to rotate with the rotatable shaft (not shown) to be measured. Shaft 30 is electrically grounded as indicated at 44 in any manner well known in the art so as to avoid electrostatic interference. For example, where housing 10 and bearings 40 are made of an electrically conductive material the shaft will be connected through bearings 40 to the housing.

Secured to end portion 32 and adapted to rotate together therewith is charge storage means for storing electric charge. Preferably, the charge storage means is formed as disk 46 having intermediate layer 48 of substantially uniform thickness and made of a dielectric material for storing electric charge. A layer 50 of an electrically-conductive material is disposed on one surface of intermediate laye 48 in electrical contact with electrical ground 44 by, for example, directly contacting shaft 30 or by securing the two together with an electrically-conductive cement. Alternatively, however, it will be appreciated that the electrically-conductive layer 50 can be allowed to "float" electrically, i.e. to be electrically insulated from the remaining parts of the tachometer. In one embodiment, disk 46 also includes layer 52 of electrically-conductive material disposed on the opposite surface of intermediate layer 48 preferably as a plurality of electrically-isolated sectors 54 as more clearly shown in FIG. 2. Each sector is substantially identical and in particular is preferably of equal surface area so that sectors 54 together with intermediate layer 48 and back layer 50 form a plurality of capacitors of substantially equal capacitance. Sectors 54 are therefore preferably of equal angular subtense. Disk 46 is described in greater detail hereinafter.

Disk 46 is supported in a backing support 56 made of an electrically-insulating material. Preferably, support 56 includes a cavity 58 sized to receive disk 46 so that the disk is securely mounted to the support. For example, the disk 46 can be mechanically mounted or, alternatively, cemented to the support 56. Support 56 is screw-threaded onto end portion 32 of shaft 30 and is preferably sized and of a thickness so as to rest against flange portion 34 of the shaft.

Figure 2:
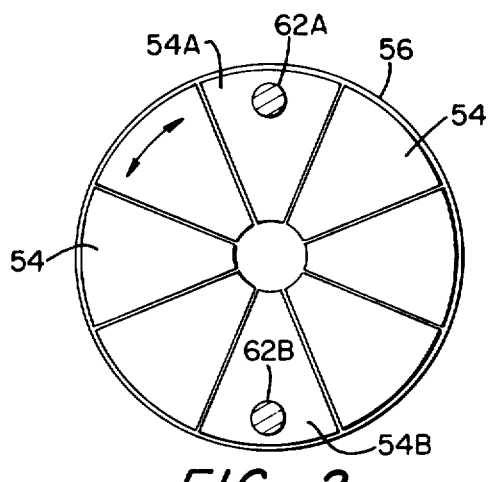
FIG. 2 is a partial cross-sectional view taken along line 2—2 of FIG. 1.

Charging and discharging means, preferably in the form of a pair of brushes 62A and 62B made of a suitable electrically conductive material such as graphite, are backed up by springs so as to press against disk 46 and so as to electrically contact sectors 54 as the disk rotates in either direction. More specifically, brushes 62A and 62B are mounted in suitable supports such as the electrically conductive sheaths 64 which in turn are secured to the insulating board 66. Compression springs 68 are mounted within sheaths 64 so as to press the brushes against the disk. It is noted that even though disk 46 may be somewhat fragile, it is reinforced by the support 56, which in turn is stiffened and aligned by the flange portion 34 of shaft 30 so as to help evade undue stress and strain on the disk. Brushes 62A and 62B are respectively positioned relative to disk 46 at two positions, angularly displaced from one another so that when each section 54 is in contact with one of the brushes it will always be electrically isolated from (i.e., out of direct electrical contact with) the other brush. Thus, although the brushes are shown in FIG. 2 as being displaced 180° from one another, the principles of the present invention will be achieved as long as the brushes are angularly displaced about the axis of rotation 38 of shaft 30 at an angle greater than the sum of the angle displaced by each section 54 and one-half of the angular subtense of both brushes.

Insulating board 66 is sized to fit within counterbore 18 of housing 10 against annular shoulder 20 so as to be secured in place between lip 26 of cap 22 and the shoulder. Suitable holes are provided in board 66 for accommodating screws 28 therethrough. Board 66 is preferably made of an electrically-insulative material of the type commonly used as substrate material in printed circuit technology with at least one surface having the circuit 70, shown in FIG. 3, printed or photoetched thereon in accordance with techniques well known in the printed and integrated circuit arts. More particularly, as shown in FIG. 3, brush 62B is connected through board 66 to an external wire 72A (extending out of the housing 10 through aperture 24 as shown in FIG. 1) to an external input potential (not shown). An external DC power source 74 is used to energize the operational amplifier 76 through external wires 72B and 72E. Brush 62A is electrically connected to the negative input of an operational amplifier 76 of circuit 70, while ground is connected to the positive input of operational amplifier 76. The negative input of operational amplifier 76 is connected through feedback resistor 78 and through feedback capacitor 77 of circuit 70, to the output of operational amplifier 76, which in turn is connected through external wire 72C to D.C. voltmeter 80, the latter being appropriately connected to ground 44. As will be appreciated hereinafter the capacitor 77 (1) smooths out sector-to-sector current pulses so that the dynamic range of the amplifier 76 is not exceeded and (2) serves to roll-off high frequency gain in order to stabilize the feedback loop. A fifth wire 72D connects meter 80, operational amplifier 76, and housing 10 to ground.

Wire 72D may also be connected to back layer 50, although as previously noted, the latter may float electrically without effecting the output of the tachometer. Wire 72D thus grounds the housing 10 so as to minimize electrostatic interference and establishes a zero voltage at the positive input of operational amplifier 76 so that the signal output of the amplifier, which is proportional to the angular speed measured, will go to zero voltage when the angular speed goes to zero. The output voltage appearing at meter 80 will thus be linearly proportional to the speed of the shaft measured multiplied by the external potential provided on wire 72A. It will be appreciated that for economy, the external potential can be provided by connecting the brush 72B directly to the positive terminal of source 74 by connecting the former to the latter through circuit 70 thereby eliminating the need for an additional power source and wire 72A.

In operation the tachometer is connected to the shaft whose angular speed is to be measured (not shown) by coupling shaft 30 thereto in any manner well known in the art, such as through sleeve 42. As the shaft 30 rotates, disk 46 rotates with the shaft so that each of brushes 62, fixed relative to the housing 10, contacts each sector 54 sequentially. In this regard it will be appreciated that disk 46 can rotate in either direction with equal results being achieved. As each sector 54 (shown as exemplary sector 54A in FIG. 2) contacts charging brush 62B, the parallel plate capacitors formed by that sector and plate 50 charge the dielectric layer 48.

It will be appreciated that the amount of charge Q provided to each sector is determined by the current i provided through the charging brush. The physical definition of the charge Q is related to the capacitance C and the charging voltage E as follows:

$$Q = CE \qquad (1)$$

This charge (measured in columbs or amp/sec.) is stored in that capacitor until the sector rotates into contact with discharging brush 62A. It is also physically true that the current i can be expressed as the time rate of change of charge:

$$i = dQ/dt \qquad (2)$$

so that $$i = E \, dC/dt \qquad (3)$$

where
E = the charging voltage applied by the charging brush; and dC/dt = the rate at which capacitors move past the discharging brush 62A.

Equation (3) thus expresses the time averaged output current in terms of the charging voltage E, and the rate at which the capacitors move under the brushes 62. As discussed in greater detail below, the rate dC/dt is dependent upon the angular speed of the rotating shaft (not shown) being measured and thus the current output applied to the negative input of amplifier 76 produces a voltage output measured by meter 80 which measurement bears a linearly proportional relationship to the angular speed measured.

More specifically, the relationship between the rate dC/dt to the shaft speed N in revolutions per second can be demonstrated. To this end the capacitance C of a parallel plate capacitor containing a dielectric of area A, thickness s, and dielectric constant k can be defined as follows:

$$C = kA/(4\pi s) \, (9 \times 10^{11}) \text{ (Farads), or} \qquad (4)$$

$$C = 8.84 \times 10^{-14} kA/s \qquad (4)$$

Equation (4) is differentiated with respect to time giving:

$$dC/dt = 8.84 \times 10^{-14} (k/s)(dA/dt) \qquad (5)$$

where dA/dt is the rate at which charged capacitance area moves past discharging brush 62A.

If a fraction b of the tachometer disc 46 of radius R is used for charge storage (where 0 < b < 1.0), then $$dA/dt = \pi R^2 bN, \text{ (cm}^2\text{sec}^{-1}) \qquad (6)$$

Equations (3), (5), and (6) can be combined to obtain an expression for the time average output current i:

$$i = 2.778 \times 10^{-13} (k/s) R^2 bNE \text{ (amperes)} \qquad (7)$$

This is the current collected by brush 62A and delivered to the negative input of the operational amplifier 76. With all other values being constant the current i is obviously proportional to shaft speed N. The current is also proportional to the charging voltage E, so that one may obtain a built-in multiplication effect where E is a scaling factor. That is, shaft speed times some other variable (inputted as E) may be a desired form of output from the tachometer as for example in the embodiment described hereinafter with reference to FIG. 10. The physical dimensions s, R, and area fraction b also affect the output current. But these physical dimensions are fixed once the tachometer is assembled. The dielectric constant of the disc 46 also has an effect upon the output current i, and in most cases it would be desired to have this property of the material be stable with temperature. In some applications, however, one could intentionally employ a temperature coefficient for k in such a way as to affect a control function elsewhere in the system. In like fashion, the feedback resistor 78 should be stable with temperature, although it should be appreciated that it could be used as a temperature sensor. Finally, the temperature coefficients of the feedback resistor and of the dielectric could be designed to compensate each other in such a way that the output current i would be minimally affected by the operating temperature of the tachometer. Finally, by way of example, the output voltage e appearing upon wire 72C when the feedback resistor has a value of ten MegOhms is expressed by:

$$e = 2.778 \times 10^{-6} kR^2 bNE/s \text{ (volts)} \qquad (8)$$

Where large periods of time elapse between use of the tachometer, the initial start-up of the tachometer, may yield no current output until the first capacitor charged by charging brush 62B contacts discharging brush 62A. Thus, as shown in FIG. 2, where brushes 62A and 62B are displaced 180°, the disk will initially rotate some what less than the first 180° before a signal output is provided. Accordingly, this half-turn must be taken into account when measuring angular displacement after a long pause.

It will be appreciated that each capacitor formed by a sector 54 is charged almost instantaneously when contacting charging brush 62B, due to the low resistance provided in the charging circuit between power source 74 and the capacitor being charged. Discharge through discharging brush 62A is also almost instantaneous because it arrives at virtual ground existing at the negative input of the operational amplifier 76. However, the output of amplifier 76 does not show the sharp current pulse as a voltage pulse due to the presence of capacitor 77. Thus, the charge storage means always completely discharge at any angular speed of shaft 30 which are to be measured. Further, as each capacitive element formed by each sector 54, back layer 50 and the dielectric material therebetween discharges, the discharging produces a ripple in the direct current output of discharge brush 62A. This ripple could be reduced by, for example, simply increasing the value of capacitor 77. However, by using integrating operational amplifier 76, and feedback capacitor 77 the ripple in the direct current signal output is smoothed so as to provide an average voltage signal proportional to the average current signal.

The ripple voltage is at a frequency equal to nN, where n is the number of sectors 54. This frequency can be very useful for calibration of the tachometer during final testing, and the feedback resistor 78 can be adjusted to a final value according to such a calibration. By this means the output voltage e could be set to a fixed function with respect to shaft speed N, independently of manufacturing variations in R, k, s, and b.

Disk 46 can be a standard commercially-available ceramic disk type capacitor. Such capacitors are well known in the art. See for example, Standard Handbook for Electrical Engineers, Edited by Fink, D. G. and Caroll J. M., McGraw-Hill Book Company, New York, 1968, pp. 5-21 through 5-30, inclusive, for a discussion of these as well as other types of capacitors. Typically, the dielectric constant, K, of equations (4), (5), (7) and (8), for high stability, low temperature coefficient ceramic dielectric materials of these types of capacitors is between about 100 and 200. The temperature coefficients of these materials can be as low as $30 \times 10^{-6}/°C$. or zero depending upon the temperature interval considered. Depending on the application, if a material having a higher temperature coefficient can be tolerated, e.g. in the range of $200 \times 10^{-6} - 500 \times 10^{-6}/°C$., materials with dielectric constants between about 1000 and 2000 can be used. The thickness s, of the dielectric material may be within a rather large range of values, e.g. 0.01 cm-0.30 cm, with 0.05 cm being typical. Finally, the radius R may also be within a rather large range of values, e.g. 0.1-10 cm, with 1 cm being typical. Thus, from equation (8) where power source 74 is of a value $E = 10$ volts, D.C.; $b = 0.5$; resistor $78 = 10^7$ ohms and $k = 150$:

$e = 2.778 \times 10^{-6}(150)(1^2)(0.5)N(10)/(0.05)$ $e = 4.17 \times 10^{-2}$ Volt rps$^{-1}$ $e = 41.7$ mV rps$^{-1}$, or, $e = 0.695$ Volt/1000 rpm, for the lower dielectric constant material.

Where a dielectric material of higher dielectric constant is used (the latter being greater than the dielectric constant of the material of lower dielectric constant by a factor of ten), the response would be greater than 0.695 by a factor of ten with a penalty of lower temperature stability.

Disk 46 can be manufactured in a number of ways. For example, a commercially available capacitor can be purchased in which each side of the dielectric material is coated with a metallic layer of, for example, silver or copper. One layer can be etched to form the sectors. Alternatively, however, the dielectric material having a coating on only one side, the coating defining the back layer 50, can be manufactured. The front layer 52 can be provided on the front of dielectric layer 48 in the particular design desired either by printing or plating upon an evaporated film. As another alternative to the design of disk 46 it will be appreciated that the layer 48 could be a plate separate from the intermediate layer and formed for example, integrally with the end portion 32 of shaft 30.

Figure 4:
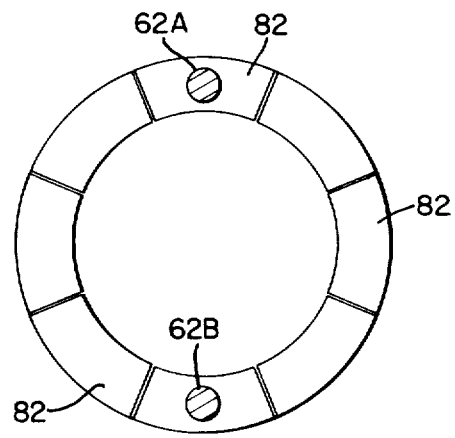
FIG. 4 is a partial cross-sectional view similar to FIG. 2 of an alternative embodiment of the charge storage disk.
Figure 5:
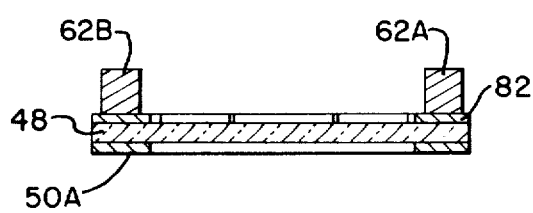
FIG. 5 is a cross-sectional view through a third embodiment of the charge storage disk.

Referring to FIG. 4, a further modification of disk 46 is shown wherein substantially the pie-shaped sectors 54 are replaced by the arcuate sectors 82, each of substantially equal surface area, which are arranged in an annular distribution concentrically with axis 38 with each sector 82 being electrically isolated from the others. This essentially has the effect of reducing the charging area provided by the surface area of each sector 82 when compared to the sectors 54. Although the back layer 50 remains the same in the FIG. 4 embodiment as described with respect to the embodiment shown in FIGS. 1-3, alternatively layer 50 can be provided in the form of an annular ring 50A as shown in FIG. 5.

As shown in FIG. 6, for certain dielectric materials capable of being polarized and holding a charge, layer 52 can be omitted. In this latter situation the charging brush 62B functions as a charging plate of a capacitor formed by the charging brush 62B, dielectric layer 48 and back layer 50. Brush 62B rubs charge onto the front surface of layer 48 as the latter rotates. Due to the characteristic of layer 48 to polarize when subjected to an electromotive force, layer 48 will hold charge until the particular surface area so affected contacts the discharging brush 62A at which time the discharging brush 62A, dielectric layer 48 and layer 50 form a capacitor to be discharged through discharging brush 62A. Due to the nature of such a dielectric layer to hold charge through the angular displacement of shaft 30 between charging brush 62B and discharging brush 62A, brush 62A collects current even though the electrical path to brush 62B is insulating and therefore remains electrically isolated.

In this latter embodiment, the calibration of the instrument would be dependent upon the radial location and contact area of each brush 62. This situation can be improved by substituting the annular ring 50A for layer 50 as shown in FIG. 7, so that the capacitance under each brush would be dependent upon the width of the annulus rather than variations in contact area of each brush 62. In this embodiment, the annulus ring 50A has a width substantially less than the width swept out by each contact brush 62 so as to provide a relatively constant value of capacitance.

As a further modification, the charge storage means may take other forms besides the disk shape as described and shown in any of the FIGS. 1-7. For example, as shown in FIGS. 8 and 9, hollow cylinder 90 which for example may be a hollow cylinder ceramic type capacitor comprising a hollow intermediate cylinder 92 of dielectric material disposed between inner and outer layers 94 and 96, respectively. Inner layer 94 is suitably connected to ground contact 44 or may float electrically, while layer 96 is divided into electrically isolated arcuate sections 98, each of equal exposed surface area wherein each section preferably extends the entire axial length of intermediate cylinder 92 coaxially with axis 38. Cylinder 90 can easily be connected to shaft 30 so as to be rigidly mounted thereon. In this embodiment of FIGS. 8 and 9, brushes 62 together with sheaths 64 and springs 68 are suitably mounted to housing 10, as by securing sheath 64 in cylindrical section 12 of housing 10 so that brushes 62 extend radially toward and contact arcuate sections 98 as cylinder 90 rotates with shaft 30. A cap 104 may be provided at the end of sheaths 64 (as by integrally joining the caps to the sheaths) so as to bias springs 68 against brushes 62, which in turn are biased against arcuate sections 98 as the cylinder 90 rotates with shaft 30. The brushes 62A and 62B are suitably connected to board 66 in schematically illustrated at 106, in the manner described with respect to FIG. 3.

In the embodiments described, the number of sectors 54 or 82 or sections 98 may vary from none (as shown in FIGS. 6 and 7), to as many as practically possible. Typically, charge storage means of the type described in FIGS. 1 to 3 having a radius of 1 cm, can be made with 20 sectors with good results.

Figure 10:
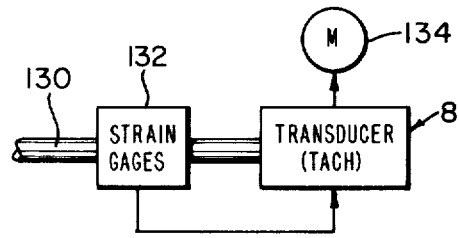
FIG. 10 is a block diagram of a power meter utilizing the principles of the present invention.

The tachometer thus described has many uses. One particular use is shown in FIG. 10, wherein apparatus for measuring the instantaneous power output of a rotating shaft 130 includes the tachometer 8 suitably coupled to the shaft in a manner previously described.

As well known the instantaneous power output to the shaft 130 equals the measured instantaneous torque T of the shaft multiplied by the instantaneous angular velocity of the shaft. Further, as previously described with respect to FIG. 3 the current collected by brush 62A and delivered to the negative input of the operational amplifier 76 is proportional to the charging voltage, which is the D.C. voltage provided by source 74 when line 72A is connected to line 72B as shown. However, in accordance with the FIG. 10 embodiment lines 72A and 72B are not connected together, and instead, means 132 are provided for deriving a signal proportional to the torque output of shaft 130, which signal is applied to the line 72A of the tachometer 8. Means 132 may be any type of torque transducer, for example, one comprising several strain gages positioned about the shaft such transducers being well known in the art. See, for example, Norton, *Handbook of Transducers for Electronic Measuring Systems*, Prentice Hall, Inc., Englewood Cliffs, N.J., 1969, pp. 255-292. The output signal of tachometer 8 will thus be proportional to the angular velocity and output torque of shaft 132 and thus proportional to the instantaneous power output of the shaft. The output signal can accordingly be measured, for example, by meter 134 to give a visual indication of the instantaneous power output.

The apparatus of the invention thus described provides a relatively inexpensive, light-weight instrument relatively easy to manufacture and construct and requiring relatively few commercially available electronic components. The tachometer of the present invention provides a relatively smooth output signal especially at low speeds and a relatively stable calibration between its electrical output signal of the instrument and the measured shaft displacement or speed over relatively long periods. Further, the electrical output signal provided by amplifier 76 is linearly proportional to the shaft speed. Finally, due to the absence of large capacitances and inductances in measuring circuit 70, the electrical output signal will not lag with the shaft speed. Finally, the apparatus will work equally well regardless of the direction of rotation of shaft 30.

Since certain changes may be made in the above apparatus without departing from the scope of the invention herein involved, it is intended that all matter contained in the above description or shown in the accompanying drawings should be interpreted in an illustrative and not in a limiting sense.

What is claimed is:

1. Apparatus for measuring the angular speed of a rotating shaft, said apparatus comprising:
   capacitive charge storage means for storing charge, said charge storage means including a disk mounted on and rotatable with said shaft, said disk defining at least one capacitor rotatable about the rotation axis of said shaft at an angular velocity related to the speed of said shaft;
   charging means in contact with said charge storage means for charging said charge storage means at a first predetermined angular position of the latter;
   discharging means in contact with said charge storage means for discharging said charge from said charge storage means at a second predetermined angular position of the latter angularly displaced from said first position, said charging and discharging means being electrically isolated from one another so that the injection of charge through said charging means into said charge storage means and the subsequent discharge thereof through said discharge means following rotation of said shaft through the angular displacement between said first and second angular positions will produce an electrical signal having a value linearly related to the speed of said shaft.

2. Apparatus according to claim 1, wherein said disk includes a layer of dielectric material, a first layer of electrically-conductive material disposed on one side of said layer of dielectric material, and a second layer of electrically conductive means disposed in a predetermined pattern on the other side of said layer of dielectric material so as to define with said first layer and said layer of dielectric material a plurality of capacitors, each movable through said first and second predetermined angular positions.

3. Apparatus according to claim 2, wherein each of said capacitors is equal in its value of capacitance.

4. Apparatus according to claim 2, wherein said second layer is disposed on said layer of dielectric material in a plurality of electrically isolated sections, each of said sections being movable through said first and second predetermined angular positions.

5. Apparatus according to claim 4, wherein each of said sections is substantially of equal surface area.

6. Apparatus according to claim 5, wherein each of said sections are pie-shaped.

7. Apparatus according to claim 5, wherein each of said sections are arcuate-shaped.

8. Apparatus according to claim 5, wherein said sections are disposed equiangularly around said disk.

9. Apparatus according to claim 8, wherein said first and second predetermined angular positions are disposed at an angle greater than the angle displaced by each of said section plus one-half the angle subtended by said charging means and said discharging means.

10. Apparatus according to claim 2, wherein said first layer is disposed on said one side of said dielectric material as an annular ring coaxial with said axis of rotation.

11. Apparatus for measuring the angular speed of a rotating shaft, said apparatus comprising:
   capacitive charge storage means for storing charge, said charge storage means including at least a layer of dielectric material and a layer of electrically-conductive material disposed on one side of said layer of dielectric material, said layer of dielectric material being capable of being polarized and storing charge and being capable of being coupled to said shaft so as to be rotatable about a predetermined axis at an angular velocity related to the speed of said shaft;
   charging means including a brush for contacting the other side of said layer of dielectric material opposite said one side so as to charge said charge storage means at a first predetermined angular position of the latter;
   discharging means including a brush for contacting the other side of said layer of dielectric material so as to discharge said charge from said charge storage means at a second predetermined angular position of the latter angularly displaced from said first position, said charging and discharging means being electrically isolated from one another so that the injection of charge through said charging means into said charge storage means and the subsequent discharge thereof through said discharge means following rotation of said shaft through the angular displacement between said first and second angular positions will produce an electrical signal having a value linearly related to the speed of said shaft.

12. Apparatus according to claim 11, wherein said layer of electrically conductive material includes an annular ring on said one side disposed coaxially with said axis of rotation.

13. Apparatus according to claim 1 further including a back-support for resiliently supporting said disk on said shaft.

14. Apparatus according to claim 1, wherein said charge storage means includes means including a plurality of capacitors, each of equal value in capacitance and movable through said first and second predetermined angular positions.

15. Apparatus according to claim 1, wherein said discharge means produces a d.c. current signal, the magnitude of which is linearly proportional to the speed of said shaft.

16. Apparatus according to claim 1, further including means for converting said current signal into a d.c. voltage signal.

17. Apparatus according to claim 1, wherein said charging means includes means for applying a control voltage to said charging means so that said electrical signal produced from the discharge of said charge storage means is the product of said control voltage and a voltage proportional to said angular speed of said shaft.

18. Apparatus according to claim 17, wherein said control voltage is proportional to the instantaneous torque of said shaft and said value of said electrical signal is proportional to the instantaneous power output of said shaft.

19. Apparatus according to claim 1, further including means for compensating for variations in operating temperature so that said electrical signal is minimally affected by the operating temperature of said apparatus.

20. Apparatus for measuring the angular speed of a rotating shaft, said apparatus comprising:

capacitive charge storage means for storing charge, said charge storage means including a cylinder mounted on and rotatable with said shaft, said cylinder defining at least one capacitor rotatable about the rotating axis of said shaft at an angular velocity related to the speed of said shaft;

charging means in contact with said charge storage means for charging said charge storage means at a first predetermined angular position of the latter;

discharging means in contact with said charge storage means for discharging said charge from said charge storage means at a second predetermined angular position of the latter angularly displaced from said first position said charging and discharging means being electrically isolated from one another so that the injection of charge through said charging means into said charge storage means and the subsequent discharge thereof through said discharge means following rotation of said shaft through the angular displacement between said first and second angular positions will produce an electrical signal having a value linearly related to the speed of said shaft.

21. Apparatus according to claim 20, wherein said cylinder includes a cylindrical layer of dielectric material having inner and outer surfaces, a first layer of electrically conductive material disposed on one surface of said cylindrical layer and a second layer of electrically conductive means disposed in a predetermined pattern on the other surface of said cylindrical layer so as to define with said cylindrical layer and said first layer a plurality of capacitors, each movable through said first and second predetermined angular positions.

22. Apparatus according to claim 21 wherein said second layer is disposed on said other surface of said cylindrical layer in a plurality of electrically isolated sections, each of said sections being movable through said first and second predetermined angular positions.

23. Apparatus for measuring the angular speed of a rotating shaft, said apparatus comprising:

capacitive charge storage means for storing charge, said charge storage means being capable of being coupled to said shaft so as to be rotatable about a predetermined axis at an angular velocity related to the speed of said shaft;

charging means in contact with said charge storage means for charging said charge storage means at a first predetermined angular position of the latter;

discharging means in contact with said charge storage means for discharging said charge from said charge storage means at a second predetermined angular position of the latter angularly displaced from said first position, said charging and discharging means being electrically isolated from one another so that the injection of charge through said charging means into said charge storage means and the subsequent discharge thereof through said discharge means following rotation of said shaft through the angular displacement between said first and second angular positions will produce an electrical signal linearly related to the speed of said shaft;

wherein said discharging means includes discharging brush means for producing a first electrical signal having a value dependent upon the time rate at which said charge storage means moves about said axis through said second predetermined position and signal generating means responsive tos aid first electrical signal for producing a second electrical signal having a value linearly related to the speed of said shaft.

24. Apparatus according to claim 23, further including a housing, said charge storage means, charging means and discharging means all being disposed within and mounted with respect to said housing.

25. Apparatus according to claim 24, further including a mounting board disposed within said housing for supporting said signal generating means.

26. Apparatus according to claim 25, wherein said signal generating means includes an operational amplifier.

27. Apparatus according to claim 25, wherein said charging means includes charging brush means for injecting charge into said charge storage means and said mounting board supports said charging brush means at said first predetermined position and said discharging brush means at said second predetermined position.

* * * * *